March 16, 1954  L. LECARMURE  2,672,156
SUCTION ACTUATED GOVERNOR FOR INTERNAL-COMBUSTION ENGINES
Filed Oct. 5, 1948  3 Sheets-Sheet 1
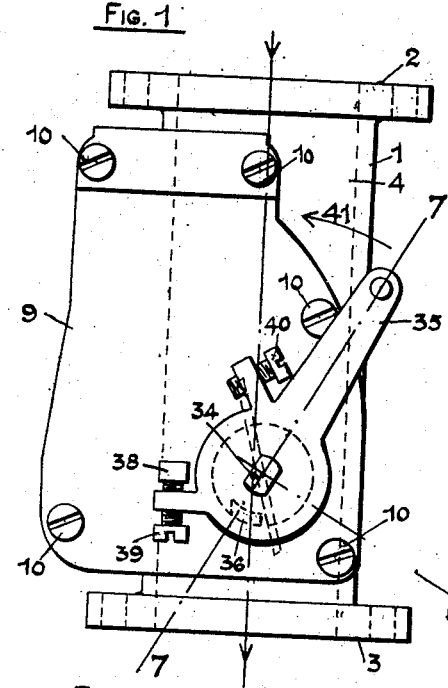
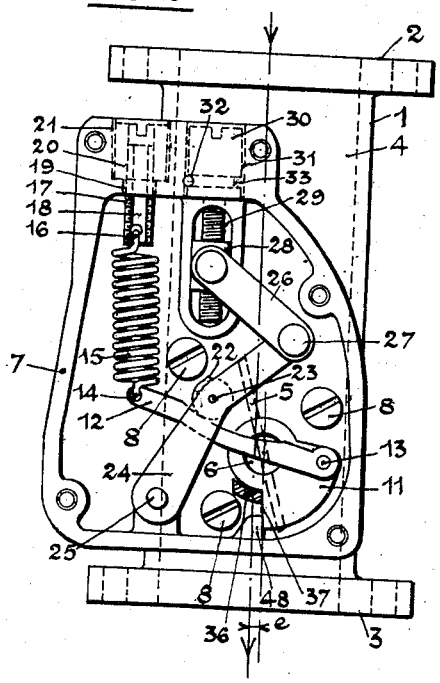
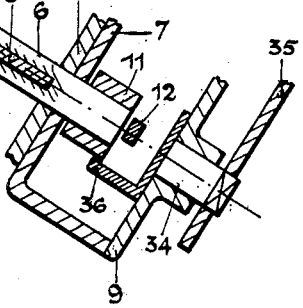
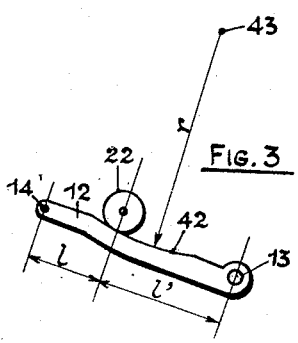
INVENTOR
LOUIS LECARMURE
BY
ATTORNEY March 16, 1954 L. LECARMURE 2,672,156
SUCTION ACTUATED GOVERNOR FOR INTERNAL-COMBUSTION ENGINES
Filed Oct. 5, 1948 3 Sheets-Sheet 2
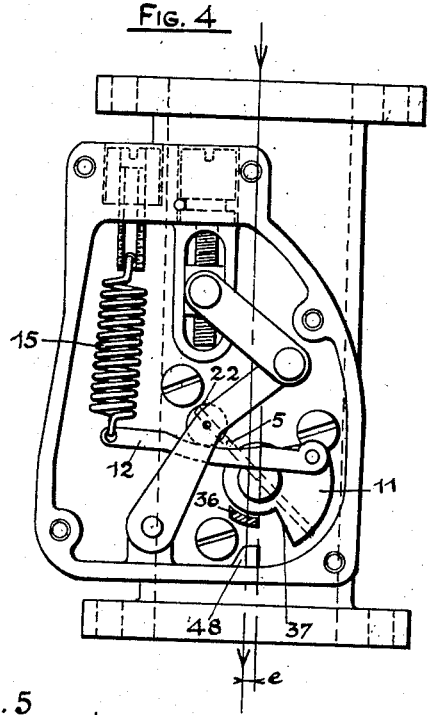
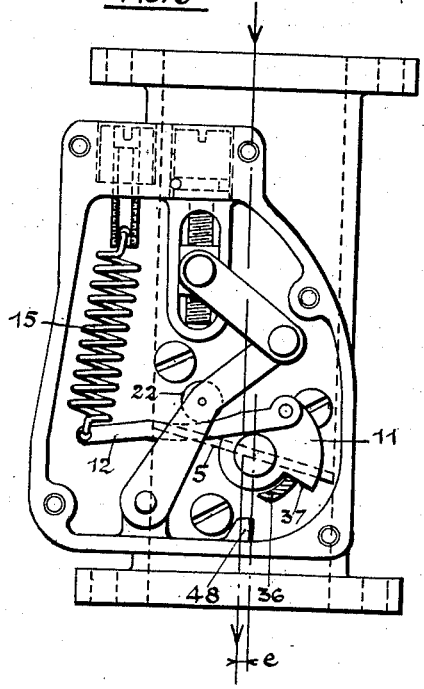
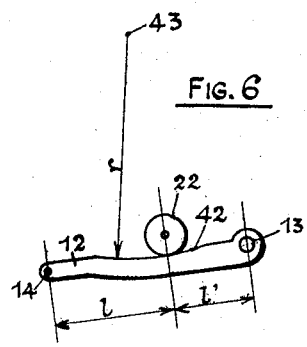
INVENTOR
Louis LECARMURE
BY
ATTORNEY

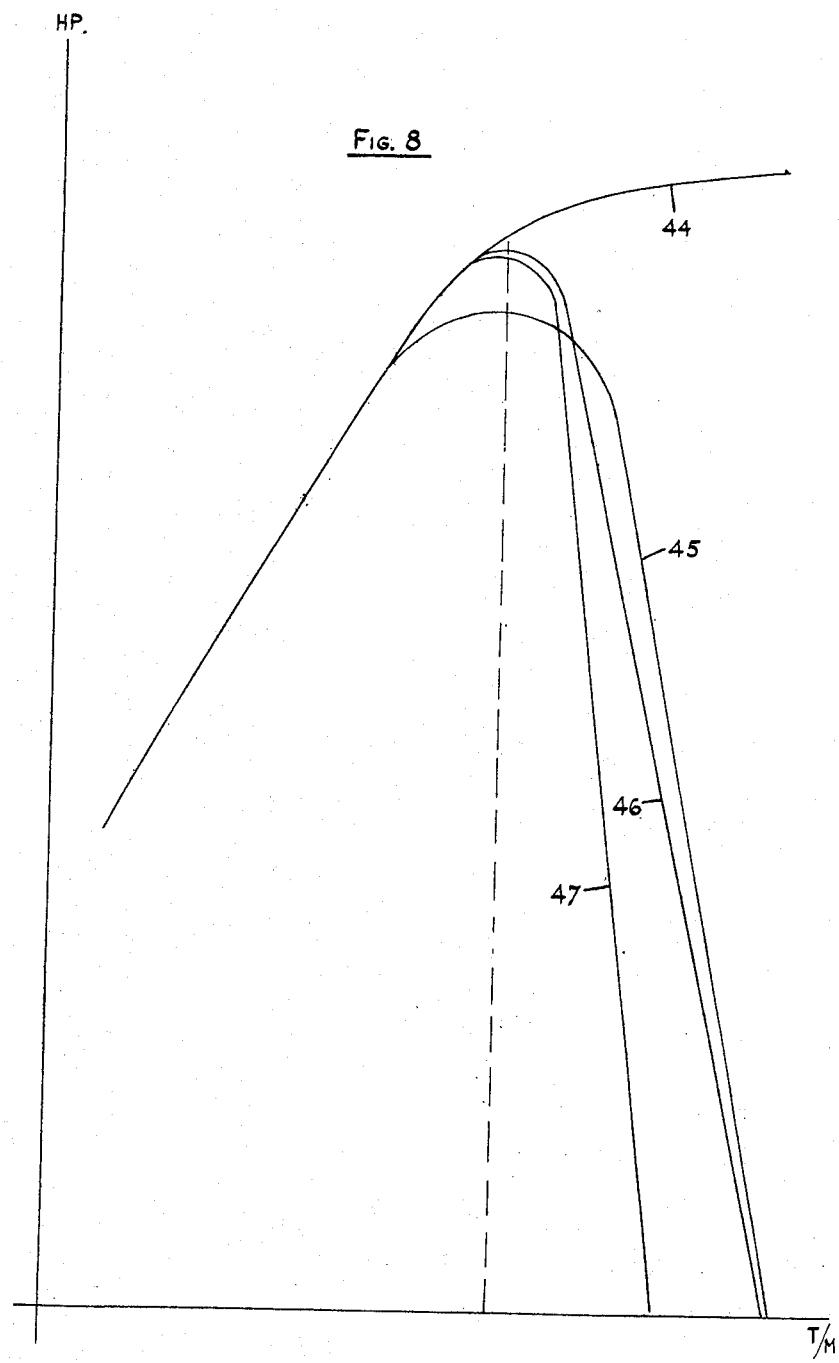

Patented Mar. 16, 1954

2,672,156

UNITED STATES PATENT OFFICE 2,672,156

SUCTION ACTUATED GOVERNOR FOR INTERNAL-COMBUSTION ENGINES

Louis Lecarmure, Houilles, France, assignor to Societe d'Etudes de Carburation pour l'Automobile et l'Aviation-"S. E. C. A. A.," Levallois-Perret, France Application October 5, 1948, Serial No. 52,928

2 Claims. (Cl. 137—484)

1

The present invention relates to suction actuated governors for internal combustion engines, in which an unbalanced throttle valve disposed in the engine induction passage is urged in the closing direction by the flow through said passage against the action of an opposing spring; when the speed of the engine (revolutions per minute) is less than a given value, the action of the spring is greater than the action of the flow on the throttle valve and the latter remains open; if, on the contrary, the engine speed exceeds the said value, the action of the flow overcomes the action of the spring and the throttle valve closes, which results in reducing the speed and bringing it down within the prescribed limits.

The invention applies mainly to governors of this kind, in which a manual control member is operative to move the throttle valve in the closing direction against the action of the spring independently of the engine speed, for the purpose of regulating the operation of the engine in normal conditions, the spring being then unable to open the throttle valve further than is permitted by the manual control, whereas the action of the flow on the throttle valve can always produce closing thereof starting from this permitted opening if the engine speed should exceed the prescribed maximum speed. However the invention applies likewise to engines having a manually controlled throttle valve separate from the governor throttle valve.

The difficulty in designing such governors resides in the fact that, when the engine load decreases, the opening required in order to maintain the speed below the maximum speed prescribed becomes smaller and smaller and, at the same time, the effort exerted by the flow on the throttle valve for this maximum speed increases considerably because the pressure differential in the induction pipe on both sides of the throttle valve increases considerably as the throttle valve progressively closes. This effort does not increase uniformly as a function of the closing angle. In fact it increases much more quickly in the vicinity of the closed position of the throttle valve (slow running position) than in the vicinity of full opening or at partial opening positions, and it is difficult to produce a spring or a system of springs and its connection with the throttle valve of such a nature that the maximum speed remains substantially constant irrespective of the engine load.

An object of the invention is to provide a suction actuated governor in which the variations of the maximum speed under load and when running light are reduced without thereby causing hunting of the throttle valve.

Another object of the invention is to provide an easy and accurate setting of the governor.

Another object of the invention is to permit the adjustment of the governor during the operation of the engine.

Another object of the invention is to provide a suction actuated governor wherein a single spring balances the closing effort on the throttle valve throughout the whole range of throttle openings.

Another object of the invention is to provide an improved suction actuated governor at reasonable cost.

Other objects and advantages will be apparent to one skilled in the art from the following description taken in connection with the appended drawings given by way of example, in which:

Fig. 1 illustrates, diagrammatically, in elevation, a governor according to the invention.

Fig. 2 illustrates, in elevation, the governor illustrated in Fig. 1, the cover of the governor being removed and the various parts being in the position corresponding to full throttle opening.

Fig. 3 illustrates a detail of Fig. 2.

Fig. 4 illustrates a view similar to Fig. 2, the manual control lever being in the position of full opening, but the throttle valve being partially closed due to the operation of the governor.

Fig. 5 illustrates a view in elevation similar to Fig. 2, the various parts being in the slow running position.

Fig. 6 illustrates a detail of Fig. 5.

Fig. 7 illustrates a partial section taken on the line 7—7, Fig. 1, of the governor illustrated in Figs. 1 to 6.

Fig. 8 illustrates operating curves of the governor illustrated in Figs. 1 to 7 with different adjustments.

A suction actuated governor according to the invention comprises a connecting lever connected at one point to the end of a spring and at another point to a throttle lever connected to the throttle valve, the connecting lever bearing at one point of contact on a supporting member, this contact point being variable on the said connecting lever when the opening of the throttle valve varies. Preferably the supporting member consists of a roller pivoted on a spindle and in engagement with which the connecting lever is maintained by the force of the spring. The throttle lever will preferably be mounted directly on the throttle shaft.

When a single throttle valve is controlled both by the governor and by a manual control, a one-way control device, which may be of any suitable type, enables the driver to actuate the throttle valve in the closing direction, the opening of the throttle valve being produced only by the spring force transmitted to the throttle valve through the connecting lever. This one-way control may consist of a lever carrying a driving finger operative on the throttle lever in the closing direction.

The shape of the ramp of the connecting lever the various points of which come into contact with the supporting member, as the opening of the throttle valve varies between the closed position and the fully open position affects the operation of the governor. This ramp could be rectilinear, or it could be curved and in such case it is preferably circular with a view to simplifying the construction.

In a preferred constructional form of the invention, the position of the roller forming the supporting member is adjustable and the initial tension of the spring is likewise adjustable.

It has been observed that in the majority of cases good operation of the apparatus requires that the connecting lever should pass in front of the throttle shaft. An important feature of the device forming the subject of the invention is therefore to dispose the various parts in such a way as to provide a free space for the passage of the connecting lever in front of the end of the throttle shaft. In particular, if the throttle valve of the governor is also controlled in the direction of closure by a manual one-way control device, this free space should be provided between the end of the throttle shaft and said one-way control device.

The governor illustrated in Figs. 1 to 7 comprises a throttle body 1 connected by a flange 2 to a carburetter supplying the combustible mixture (not illustrated) and by a flange 3 to the induction pipe of the engine (not illustrated). The combustible mixture flows downwardly in the passage 4 of the throttle body and the quantity of mixture admitted to the engine is adjusted by the throttle valve 5 mounted on a shaft 6. The shaft 6 of the throttle valve is slightly eccentric by a distance e in relation to the axis of pipe 4. The shaft 6 is mounted preferably on needle bearings (not illustrated) in order to reduce friction and thus to increase the sensitivity of the apparatus.

As regards the invention, it is immaterial whether the carburetter, i. e. the part forming the fuel-air mixture, is located above or below throttle body 1. If the carburetter were located below throttle body 1 between flange 3 and the induction pipe of the engine, pure air instead of combustible mixture would flow through throttle body 1 and throttle valve 5 would then regulate the quantity or air supplied to the engine.

The casing 7 of the governor is fixed on the throttle body by three screws 8, or again, this casing could be cast with throttle body 1. The casing 7 is closed by a cover 9 fixed on the casing by screws 10 (Fig. 1). The internal parts of the governor are shown in Figs. 2, 4 and 5 which illustrate the governor, the cover 9 being removed. The shaft 6 of the throttle valve projects inside casing 7 and on the end of said shaft is mounted a throttle lever 11. A connecting lever 12 is connected at one of its ends by a pivot 13 to throttle lever 11, and, at its other end 14, to the end of a spring 15. The opposite end 16 of spring 15 is attached to a screw 17. The screw 17 is guided in an aperture 19 provided in casing 7, by means of two flat parts 18 which prevent the rotation of the screw. A nut 20 capable of turning in a recess 21 is screwed on screw 17. By turning nut 20, screw 17 can be raised or lowered and the adjustment of the initial tension of spring 15 is thus effected. A stop (not illustrated) provides for locking the nut 20, after adjustment. Connecting lever 12 bears on a roller 22 pivoted on a spindle 23 carried by a lever 24. In order to provide for adjusting the position of roller 22, lever 24 is mounted on a spindle 25. The two ends of a link 26 are connected respectively by pivots to the end 27 of lever 24 and to a nut 28 threadedly receiving a screw 29. The head 30 of screw 29 turns in a housing 31 of casing 7. A pin 32 fixed in casing 7 and engaged in a groove 33 of the head 30 prevents vertical movements of screw 29. By turning screw 29 by means of its head 30, a vertical movement upwards or downwards of nut 28 is produced and lever 24 and roller 22 are thus displaced through link 26. This arrangement provides for effecting a very accurate adjustment of the position of the roller. When the adjustment is completed, the head 30 of screw 29 is locked by means of a stop which has not been illustrated.

Lever 12 and roller 22 are illustrated in Figs. 3 and 6 in positions which correspond respectively to full opening and closed (slow-running) position of the throttle valve. The part of lever 12 which rolls on roller 22 is profiled and it consists preferably of a circular ramp 42, of centre 43 and of radius r. As shown in Figs. 3 and 6, the total displacement of lever 12 in relation to the roller, when the throttle valve passes from the full open position to the slow-running position, is small and the rotation of the roller, in the course of this same movement, is itself small. Consequently the friction of the roller 22 on its spindle has only a negligible influence on the sensitivity of the apparatus.

A spindle 34 pivoting in the cover 9 (Fig. 1) carries, on the outer side of the cover, a lever 35 and, on the inner side of the cover, a driving finger 36. Lever 35 is connected to the driver's accelerator control (not illustrated), whilst finger 36 (Fig. 2) is adapted to drive lever 11 by its edge 37. A stop 38 carried by the cover 9 (Fig. 1) co-operating with two regulating screws 39 and 40, defines the positions of full opening and of slow-running of the throttle valve. The position of spindle 34 in relation to the shaft 6 is immaterial. It is in no way necessary for the spindle and shaft to be aligned, provided that driving finger 36 is adapted to drive throttle lever 11 by its edge 37.

If the manually controlled throttle valve is separate from throttle valve 5 controlled by the governor, the lever 35 and the driving finger 36 which it controls are omitted and suitable stops, co-operating for example with lever 11, must be provided in order to determine the position of full opening and the slow-running position of throttle valve 5.

The operation is as follows:

The shaft 6 of throttle valve 5 being slightly eccentric in relation to the passage 4, the left wing of the throttle valve is subjected, from the downdraft flow in passage 4, to a bigger thrust than the smaller right wing. The flow therefore tends to close throttle valve 5.

The control lever 35 being disposed in the fully open position as illustrated in Fig. 1, if the engine speed is less than the prescribed maximum speed, the various parts of the governor take up the position illustrated in Figs. 2 and 3. The effort of spring 15 transmitted to throttle lever 11 by connecting lever 12 bearing on roller 22, is bigger than the effort exerted by the flow on throttle valve 5 in the closing direction. The effort of spring 15 therefore maintains lever 11, by its edge 37, in contact with driving finger 36 actuated by lever 35. The throttle valve 5 therefore occupies the position of full opening which is less than 90° and which will correspond, for example, in practice to an opening of about 75°. This position of maximum opening is determined by a stop 48 co-operating with the edge 37 of throttle lever 11. The throttle valve is thus submitted, from the downdraft flow in passage 4, to a slight force which provides for initiating the closing of the throttle valve, if the speed were to exceed the maximum prescribed speed.

As long as the speed does not exceed the maximum prescribed speed, the position of throttle valve 5 is determined solely by the position of control lever 35, lever 11 being maintained in contact with driving finger 36. When the driver operates the lever 35 in the direction of the arrow 41 (Fig. 1) from the position of full opening to the slow-running position, driving finger 36 produces closing of throttle valve 5 from the position illustrated in Fig. 2 to the position illustrated in Fig. 5. For, whatever be the opening of the throttle valve, the force exerted by the flow on throttle valve 5 in the direction of closure remains less than the force exerted by the spring 15 the action of which remains preponderant.

The control lever 35 occupying the position of full opening, if the engine speed rises above the maximum prescribed speed, the force exerted by the flow on throttle valve 5 becomes greater than the force exerted on said throttle valve by spring 15 and the throttle valve closes, lever 11 breaking contact with driving finger 36. The closing of the throttle valve produces a decrease in the engine speed and said throttle valve is stabilised in a position of equilibrium such as that illustrated in Fig. 4, for which the speed has been brought down to the maximum permitted value and for which the efforts exerted respectively on the throttle valve by the flow on the one hand and by the spring on the other hand are balanced. The parts of the apparatus are determined and regulated in such a way that this equilibrium is produced irrespective of the opening of the throttle valve, for a value of the speed substantially equal to the prescribed maximum speed.

If lever 35 were disposed in a position of partial opening, an increase in the speed above the maximum prescribed speed would cause closure of the throttle valve in similar conditions, until the throttle valve reaches a position of equilibrium corresponding substantially with the prescribed maximum speed.

In order to adjust the apparatus on a new type of engine, the characteristics of the spring 15 to be used and the shape of lever 12 to be adopted will be determined by experiment. To this end, experiments will be made with different springs and with levers 12 varying by the radius $r$ of the circular ramp 42 or by the position of the centre 43. The procedure will be similar for the angular setting of the lever 11 on the shaft 6 of the throttle valve. These three elements: spring, lever and setting of the throttle lever, having been determined, the setting on different engines of a similar type will be completed by means of nut 20 which adjusts the tension of the spring, and of screw 29—30 which adjusts the position of roller 22. This setting may be made during operation of the engine, which is an important advantage of the device forming the subject of the invention.

The governor according to the invention provides for easy and accurate adjustment. The characteristics of the spring have only a fairly small influence on the operation of the apparatus, whereby the small variations which may exist between springs of a similar series are without disadvantage.

The modification of the position of roller 22 changes the law of variation of the ratio of the lever arms $l$ and $l'$ (Figs. 3 and 6), and, in consequence, the law of variation of the force transmitted to throttle valve 5. When roller 22 is moved towards the right, the force transmitted from the spring to the throttle valve increases more quickly when the throttle valve closes.

By modifying the radius $r$ of the circular ramp 42 and the position of the centre 43, the elongations of the spring which correspond to a similar degree of closure of the throttle valve are modified, and likewise the direction of the reaction exerted by the roller on the lever is modified. The law of variation of the force transmitted from the spring to the throttle valve can thus be modified within very fine limits.

By way of example, Fig. 8 illustrates different power curves obtained on an engine with various regulating elements. In Fig. 8, the speed (revolutions per minute) is shown as abscissa and the engine power as ordinate, control lever 35 being in the position of full opening. The curves are obtained by progressively reducing the engine load down to running light.

The curve 44 represents the engine power curve, the governor not operating, i. e. the throttle valve being maintained constantly wide open.

The curve 45 represents a power curve obtained with some regulating elements. This curve is defective in that the engine does not reach its maximum power for the speed considered. By decreasing the radius $r$ of the circular ramp 42 of lever 12, the power curve 46 is obtained. The engine then reaches its full power at the speed considered, but the variation between the maximum speed under load and the maximum speed when running light is too big.

By modifying the angular setting of throttle lever 11 on throttle shaft 6 and the position of the centre 43 of the ram 42, the curve 47 finally is obtained, which is satisfactory. The engine develops its maximum power at the speed considered and the variation between the maximum speed under load and the maximum speed when running light is reduced to an acceptable value.

It has been observed that, in order to obtain a satisfactory operation of the governor on engines used for experiments, it was necessary for the connecting lever 12 to be able to pass in front of the end of the shaft 6 of the throttle valve. Experiments have shown, in fact, that with full opening of the throttle valve (Fig. 2) when the adjustment is correct, the point of contact between roller 22 and lever 12, the centre of throttle shaft 6 and the pivotal point 13 of lever 12 on throttle lever 11, are not far from being aligned. In order to permit such an adjustment, it is necessary for the end of the shaft 6 of the throttle valve not to pass through the plane in which lever 12 moves and for a free space to be provided for the passage of said lever 12 between the end of shaft 6 and the inner end of spindle 34 of control lever 35. This is an important feature of one practical construction of the governor forming the subject of the invention. This arrangement is illustrated in Fig. 7, which shows in section the relative positions of shaft 6, of lever 12 and of spindle 34.

It is to be understood that the arrangement or showing of the various parts may be modified in detail without departing from the scope of the invention.

I claim:

1. In a suction actuated governor for an internal combustion engine, having a framing structure providing an induction passage, the combination of a throttle shaft pivoted in said structure and eccentric in relation to said passage, an unbalanced throttle valve attached to said throttle shaft and disposed in said passage to be urged in the closing direction by the flow therethrough, a throttle lever fast with said throttle shaft, an adjusting lever pivotally supported by said structure, a roller pivotally mounted on said adjusting lever, means for adjusting the position of said adjusting lever, a connecting lever bearing at one of its points on said roller and pivotally connected at another of its points directly with said throttle lever so as to impart a rotating motion to said roller and to vary the engagement point of said connecting lever with said roller as said throttle valve is moved, and a spring supported at one of its ends from said structure and connected at its other end with said connecting lever at a third point thereof for biasing said throttle valve in the opening direction, whereby the effect of said spring is varied as said throttle valve is moved.

2. The invention according to claim 1 wherein means are provided for adjusting the tension of said spring.

LOUIS LECARMURE.

References Cited in the file of this patent

UNITED STATES PATENTS

| Number | Name | Date |
|---|---|---|
| 1,494,996 | Crawford | May 20, 1924 |
| 1,749,500 | Moyers | Mar. 4, 1930 |
| 2,058,160 | Larsen | Oct. 20, 1936 |
| 2,064,864 | Temple | Dec. 22, 1936 |
| 2,327,599 | Hufford | Aug. 24, 1943 |
| 2,332,515 | Hufford | Oct. 26, 1943 |